(12) United States Patent
Niina et al.

(10) Patent No.: US 8,363,940 B2
(45) Date of Patent: Jan. 29, 2013

(54) IMAGE PROCESSING APPARATUS, IMAGE PROCESSING METHOD, AND STORAGE MEDIUM

(75) Inventors: Hiroshi Niina, Kanagawa (JP); Toshiyuki Yamada, Kanagawa (JP); Kiyotaka Tsuchibuchi, Kanagawa (JP); Junichi Shimizu, Kanagawa (JP); Minoru Sodeura, Kanagawa (JP); Masato Saito, Kanagawa (JP); Zhenrui Zhang, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 354 days.

(21) Appl. No.: 12/862,321

(22) Filed: Aug. 24, 2010

(65) Prior Publication Data
US 2011/0222795 A1    Sep. 15, 2011

(30) Foreign Application Priority Data
Mar. 9, 2010    (JP) .................... 2010-052066

(51) Int. Cl.
*G06K 9/34*    (2006.01)
*G06K 9/03*    (2006.01)

(52) U.S. Cl. ..................................... 382/173

(58) Field of Classification Search .......... 382/173–180, 382/309–311, 239; 358/537, 452, 1.9, 1.2; 345/619; 715/205–210, 243–255, 277, 766, 715/718
See application file for complete search history.

(56) References Cited

U.S. PATENT DOCUMENTS

| | | | | |
|---|---|---|---|---|
| 5,278,952 A * | 1/1994 | Kira et al. ............ | 715/209 |
| 5,689,718 A * | 11/1997 | Sakurai et al. ........ | 715/205 |
| 6,038,567 A * | 3/2000 | Young ................ | 1/1 |
| 6,043,823 A | 3/2000 | Kodaira et al. | |
| 7,085,423 B2 * | 8/2006 | Tanigawa ............. | 382/239 |
| 7,831,909 B2 * | 11/2010 | Tokunaga ............. | 715/247 |
| 8,024,667 B2 * | 9/2011 | Shaw et al. .......... | 715/766 |
| 2002/0141648 A1 | 10/2002 | Tanigawa | |

FOREIGN PATENT DOCUMENTS

| | | |
|---|---|---|
| JP | 09-091450 A | 4/1997 |
| JP | 2002-300408 A | 10/2002 |
| JP | 2002-305644 A | 10/2002 |

* cited by examiner

*Primary Examiner* — Ishrat I Sherali
(74) *Attorney, Agent, or Firm* — Sughrue Mion, PLLC (57) ABSTRACT

An image processing apparatus of the present invention includes: a separation section that separates image components having different attributes contained in electronic document data expressing an original image; a selection section that selects which mode from plural modes including a reusability emphasis mode for performing predetermined re-laying out of the image components with emphasis on reusability; and a generation section that re-lays the image components separated by the separation section according to the mode selected by the selection section, and generates software data corresponding to software for use.

10 Claims, 8 Drawing Sheets

EVEN WHEN ONLY TWO TABLES ARE WANTED, A USER NEEDS TO TURN PAGES AND SELECT FROM SOFTWARE DATA CONVERTED FOR ALL OF THE PAGES

(1) ORIGINAL IMAGE

(2) ONLY TABLES

(3) ONLY PHOTOGRAPHS (4) ONLY GRAPHICS

(5) ONLY TABLES WITHOUT TEXT (6) ONLY TEXT

FIG.8

(1) ORIGINAL IMAGE (2) ONLY TABLES (3) ONLY PHOTOGRAPHS (4) ONLY GRAPHICS (5) ONLY TEXT

IMAGE PROCESSING APPARATUS, IMAGE PROCESSING METHOD, AND STORAGE MEDIUM

CROSS-REFERENCE TO RELATED APPLICATION

This application is based on and claims priority under 35 USC 119 from Japanese Patent Application No. 2010-052066 filed on Mar. 9, 2010.

BACKGROUND

1. Technical Field

The present invention relates to an image processing apparatus, an image processing method, and a storage medium.

2. Related Art

Techniques have been proposed for separating plural image components from electronic document data obtained by reading-in and digitizing original images that include plural image components having different attributes, such as photographs, lines, text, tables and the like, and then generating electronic document data by handling the separated image components as units.

SUMMARY

The present invention improves reusability during reuse of separated image components.

An image processing apparatus of a first aspect of the present invention includes: a separation section that separates image components having different attributes contained in electronic document data expressing an original image; a selection section that selects which mode from plural modes including a reusability emphasis mode for performing predetermined re-laying out of the image components with emphasis on reusability; and a generation section that re-lays the image components separated by the separation section according to the mode selected by the selection section, and generates software data corresponding to software for use.

BRIEF DESCRIPTION OF THE DRAWINGS

Exemplary embodiments of the present invention will be described in detail based on the following figures, wherein.

DETAILED DESCRIPTION

Figure 1:
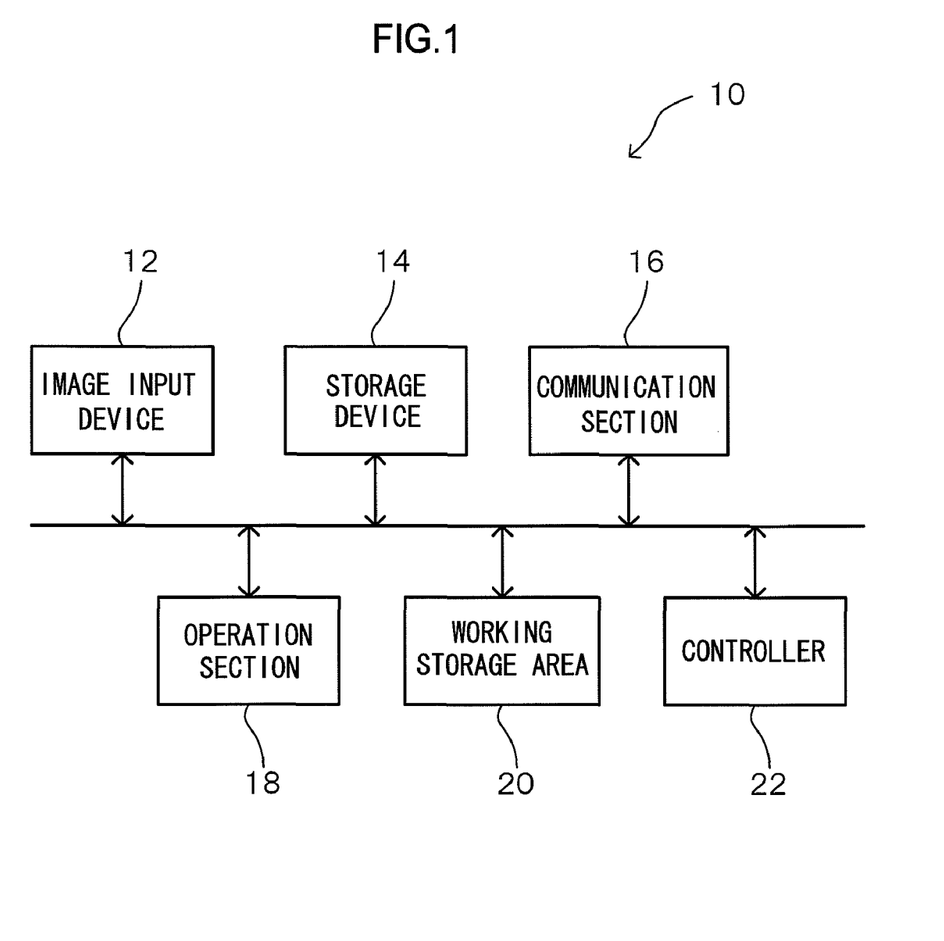
FIG. 1 is a diagram showing a schematic configuration of an image processing apparatus according to an exemplary embodiment of the present invention.

Detailed explanation follows of an example of an exemplary embodiment of the present invention, with reference to the drawings. FIG. 1 is a diagram showing a schematic configuration of an image processing apparatus according to an exemplary embodiment of the present invention.

An image processing apparatus 10 according to the present exemplary embodiment, as shown in FIG. 1, includes an image input device 12, a storage device 14, a communication section 16, an operation section 18, a working storage area 20 and a controller 22, respectively connected together, with the overall apparatus controlled by the controller 22.

The image input device 12 inputs electronic document data expressing an original image. For example, the image input device 12 may be configured with an image reading-in device that reads-in an original image and converts it into electronic document data, or configured with a storage medium on which electronic document data is stored.

The storage device 14 is stored with electronic document data input by the image input device 12 and is also stored, for example, with a program for separating plural image components with different attributes contained in the electronic document data (image components with different attributes such as text, graphics such as computer graphics (CG), lines, photographs, tables and the like) and generating electronic document data of a format enabling reuse of the image components. Such a program is for execution by the controller 22.

The communication section 16 is connected to a communication unit, such as, for example, a network, and the communication section 16 is communicated with external data processing devices (such as, for example, a personal computer, an image forming device and the like) via the communication unit, and data is transmitted and received.

The operation section 18 includes operation buttons and a display device, and, for example, various settings are made to the image processing apparatus 10, execution of the above described program is instructed, and the like, by operation of the operation buttons according to data displayed on the display device.

The working storage area 20 functions as a working storage area when the above described program is being executed, and functions as a working storage area when the controller 22 is performing various control operations of the image processing apparatus 10.

Figure 2:
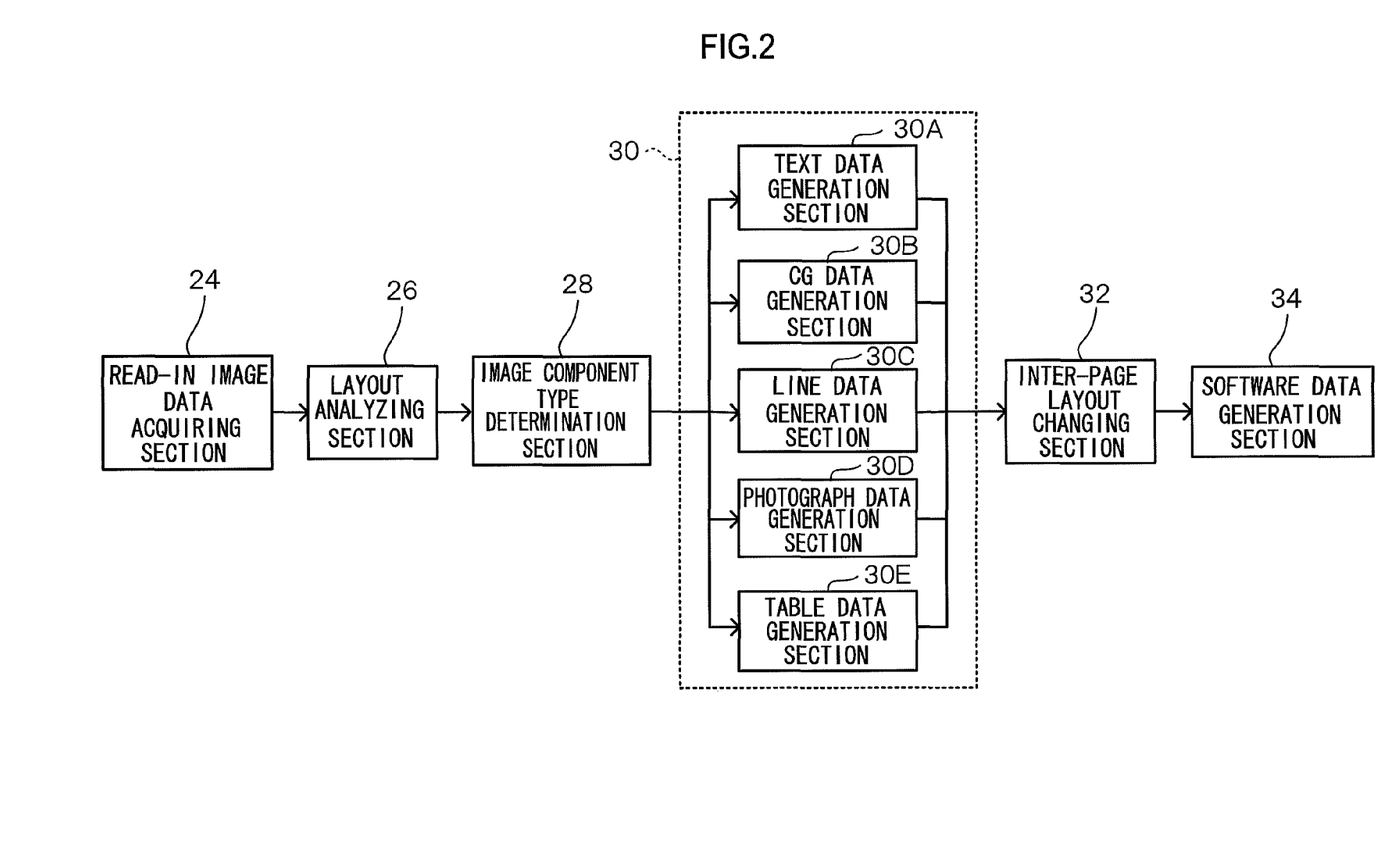
FIG. 2 is a block diagram showing a functional configuration of the image processing apparatus according to an exemplary embodiment of the present invention.

FIG. 2 is a block diagram showing a functional configuration of the image processing apparatus 10 according to the present exemplary embodiment.

The controller 22 of the image processing apparatus 10 functions as: a read-in image data acquiring section 24; a layout analyzing section 26; an image component type determination section 28; various data generation sections 30 that perform data generation by type of image component (a text data generation section 30A, a graphic (CG) data generation section 30B, a line data generation section 30C, a photograph data generation section 30D, a table data generation section 30E); an inter-page layout changing section 32, and a software data generation section 34.

The read-in image data acquiring section 24 acquires electronic document data input by, for example, the image input device 12 or the like, and acquires electronic document data stored, for example, on a storage medium or the like.

The layout analyzing section 26 analyzes the electronic document data acquired by the read-in image data acquiring section 24, and determines regions of image components by extracting regions of, for example, text, graphics (CG), lines, photographs and the like. The analyzing section 26 employs known techniques capable of determining image component regions. For example, the image component regions can be determined by processing of binarization and labeling the electronic document data, then connecting images that have been label processed.

The image component type determination section 28 determines the type of the image components, based on various characteristic amounts, such as the density distribution of the image components and the like, separates the image components, and applies attributes thereto. The type of the image component can also be determined in the determination section 28 using a known technique. For example, employable techniques are included: for example, a technique described in JP-A No. 9-91450, utilizing characteristic amounts on an image such as, for example, position, size, shape, construction, density distribution, or the like; and a technique described in JP-A No. 2002-300408, utilizing a layout analysis method in which, as pre-processing during text recognition used in optical character recognition, text images are classified into text regions, and photograph, graphic and table regions. As the type of image component for determination there are, for example, text, graphics (CG), lines, photographs, tables, and the like.

The various data generation sections 30 (the text data generation section 30A, the graphic (CG) data generation section 30B, the line data generation section 30C, the photograph data generation section 30D, the table data generation section 30E) generate data according to the type of each of the image component determined by the image component type determination section 28. Note that when there are image components corresponding to plural types of attribute, configuration may be made such that data is generated for the image components in the expression format corresponding to the respective type.

The inter-page layout changing section 32 re-lays out the data generated by each of the various data generation sections 30 with the expression format corresponding to the type of the image component. For example, in cases where an original layout emphasis mode is selected by the operation section 18, to accurately represent the layout of an original, a layout matching that of the original is determined, and in cases where a predetermined reusability emphasis mode is selected by the operation section 18, a layout is determined by each type of image component, such that the image components separated by the image component type determination section 28 are easily utilized when reusing the image components. Namely, in the reusability emphasis mode, each of the image components, such as text, graphic, line, photograph and table image components, are extracted by type of the image component, and the image components are laid-out on separate pages by type of the image component, so as to give page(s) in which the text image components are collected together, page(s) in which the graphic image components are collected together, and so on, or the particular image components that have been designated by the operation section 18 are extracted and laid out thus.

The software data generation section 34, re-lays out the data generated by the various data generation sections 30 according to the layout determined by the inter-page layout changing section 32, and generates software data corresponding to software designated by the operation section 18.

Figure 3:
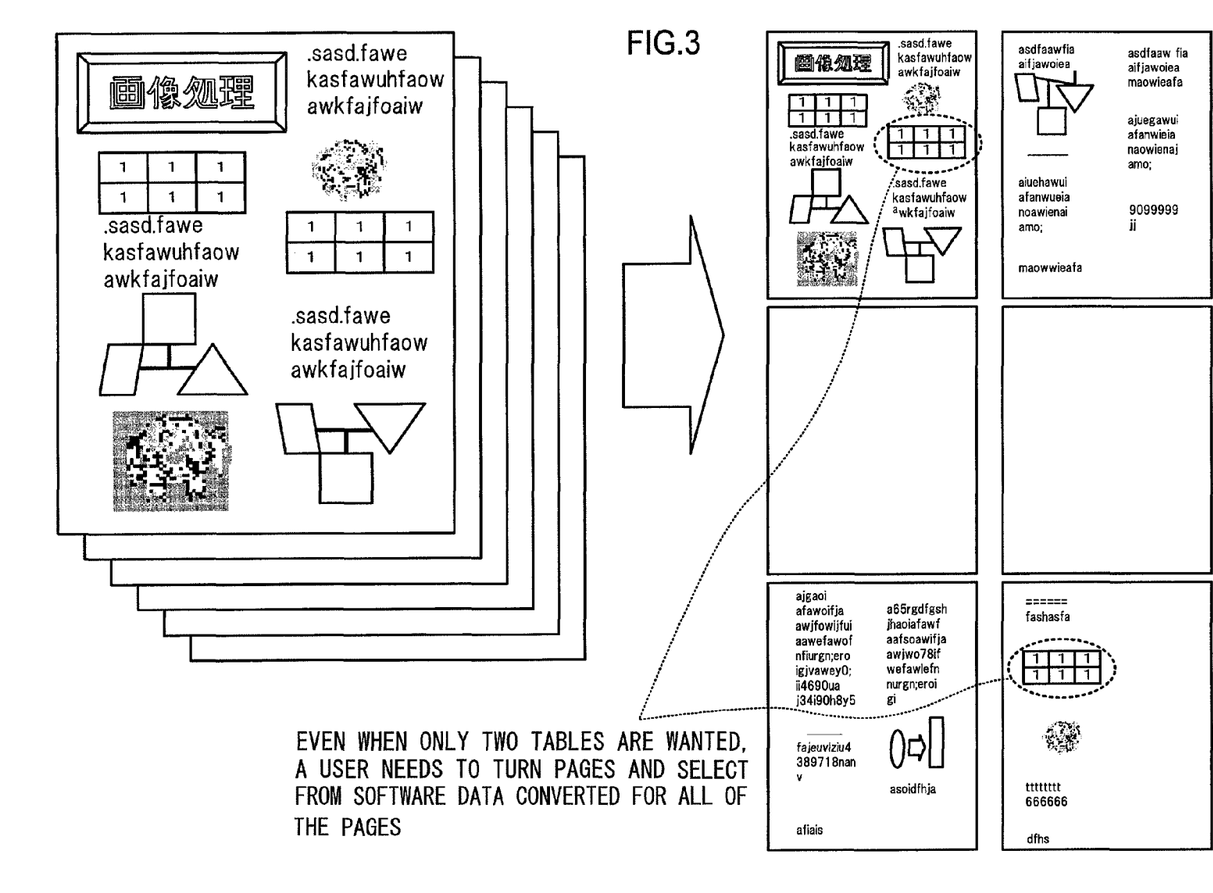
FIG. 3 is a diagram showing an example of selecting required components from within plural pages.

Normally, in cases where various types of image component included in an original image are being separated and reused, as shown in FIG. 3, image components to be reused need to be selected from within plural pages of original image. For example, even in cases where only the two tables shown within the broken lines are wanted, a cumbersome operation, involving user operation to turn over all of the pages of converted software data corresponding to software used for all pages, is required in order to identify and select the required image components.

Figure 4:
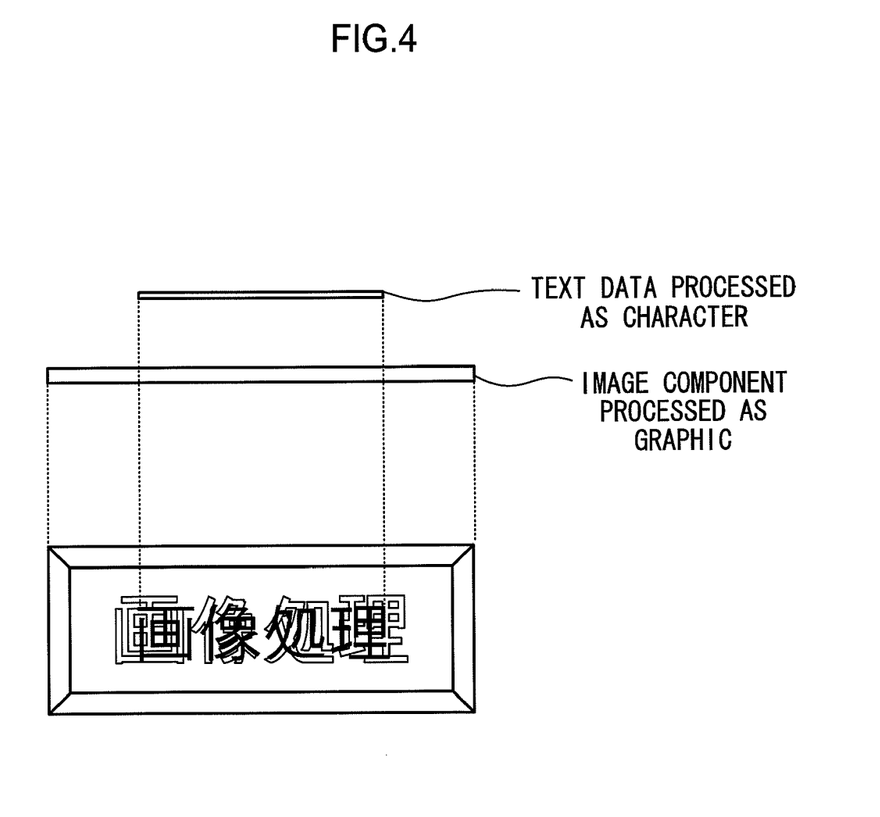
FIG. 4 is diagram showing an example in which text data processed as a character is laid out overlaying a graphic image component.

Furthermore, in cases where the image components have been separated, cases arise in which text data processed as a character is laid out overlaying a graphic image component, as shown in FIG. 4, and selection operation for one or other is cumbersome in such cases.

However, the image processing apparatus 10 according to the present exemplary embodiment has a reusability emphasis mode for use in the software data generation section 34 for converting to software data, this being a layout mode that facilitates reuse of the image components. When this reusability emphasis mode has been selected, plural image components included in the original image are separated, and, as described above, the inter-page layout changing section 32 changes the layout of the image components by the type of the image component and generates the software data. Due thereto, since the respective image components are collected together by the type of the image component, cumbersome operation when reusing the image components is suppressed.

Figure 5:
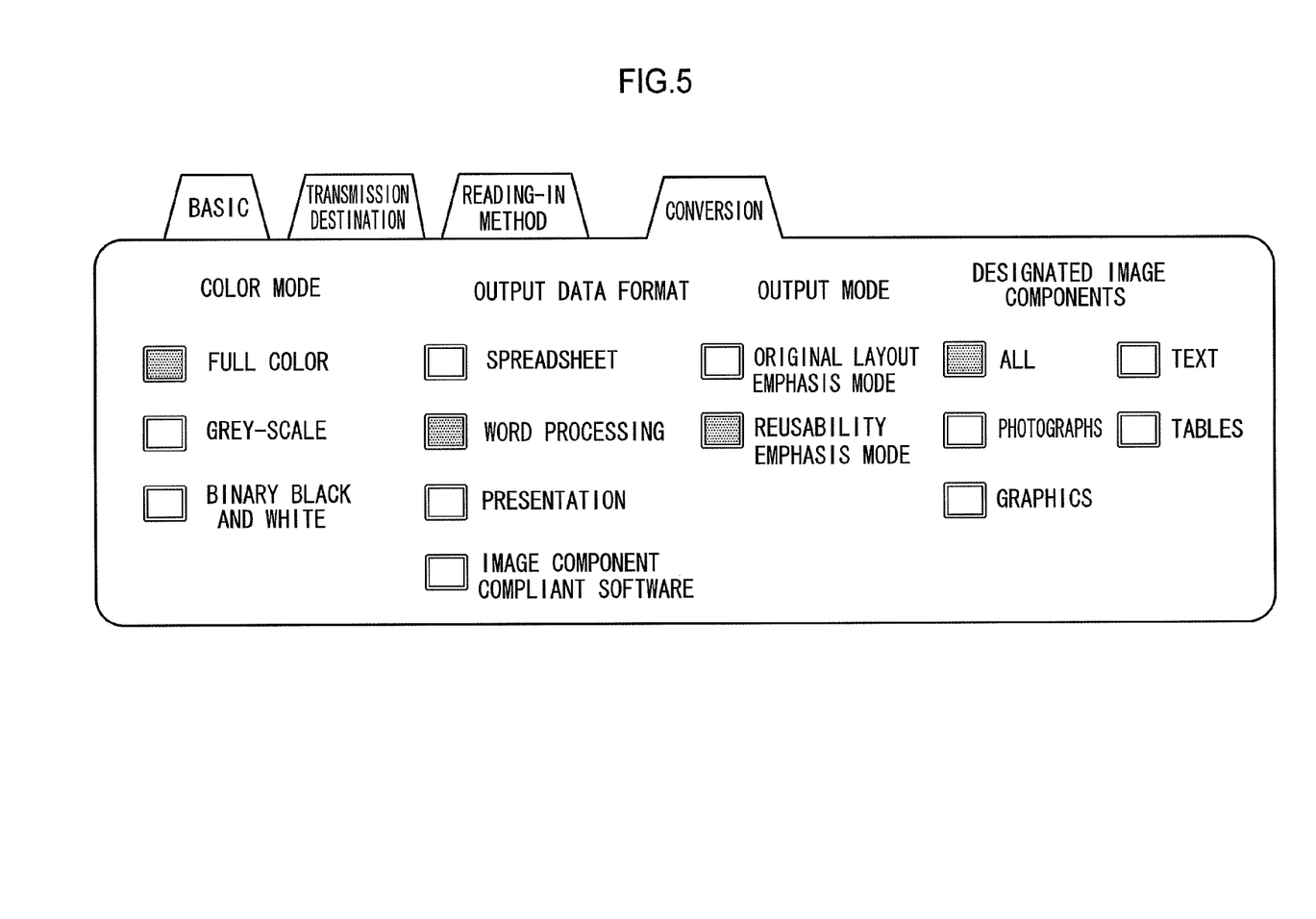
FIG. 5 is a diagram showing an example of a screen for performing various settings in an image processing apparatus according to the exemplary embodiment of the present invention.

Explanation follows regarding a configuration of the operation section 18 for instructing the above described reusability emphasis mode, and the like. FIG. 5 is a diagram showing an example of a screen for performing various settings in the image processing apparatus 10 according to the exemplary embodiment of the present invention.

The operation section 18 is configured including a display section for displaying a screen for performing various settings, and the various settings are performed by operation of the operation section 18. The display section provided to the operation section 18 displays, for example, a setting screen like that shown in FIG. 5. The example display of FIG. 5 shows an example of a screen for respectively selecting "color mode", "output data format", "output mode", and "designated image component".

In the example of FIG. 5, one or other of "full color", "gray scale", and "binarized black and white" is selectable as the "color mode", allowing setting of one output in one or other of the color modes.

One or other of "spreadsheet", "word processing", "presentation" and "image component compliant software" is selectable for "output data format", such that the data format of the data for output is selectable. Namely, one or other of spreadsheet software, word processing software, presentation software, or image component compliant software corresponding to the type of image component, is selectable as the output format.

One or other of "original layout emphasis mode" or "reusability emphasis mode" is selectable for "output mode". When original layout emphasis mode has been selected, the electronic document data expressing the original image input by the image input device 12 is generated with software data according to the output data format. When reusability emphasis mode has been selected, so as to facilitate use during reuse of separated image components, the image components included in the original image are re-laid out by type of image component, and software data is generated according to the output data format. Note that while explanation is given in the present exemplary embodiment of an example in which there are two modes of "output mode", there is no limitation to two modes, and configuration may be made with three of more types of mode provided. For example, configuration may be made such that a further mode is provided that generates software data according to the original layout emphasis mode as well as generating software data according to the reusability emphasis mode.

In "designated image component", one or more option is/are selectable from "all", "photographs", "graphics", "text", and "tables", and in cases where the reusability emphasis mode has been selected, the user desired type of image component is settable. Namely, in cases where the reusability emphasis mode has been selected, it is possible to extract desired type(s) of image component for conversion into software data.

Figure 6:
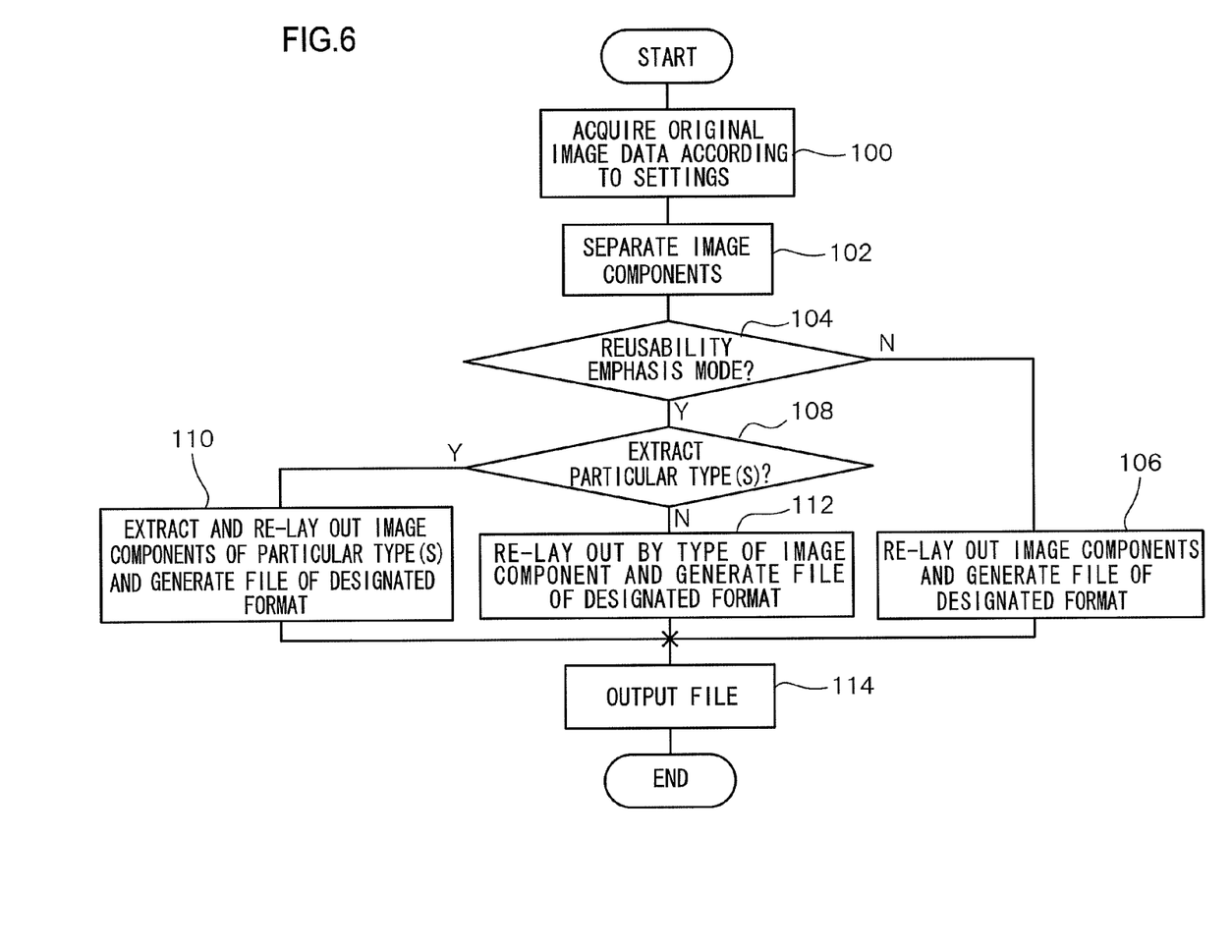
FIG. 6 is a flow chart showing an example of flow of processing performed by the image processing apparatus of an exemplary embodiment of the present invention.

Explanation follows regarding the processing performed by the image processing apparatus 10 according to the exemplary embodiment of the present invention, configured as described above. FIG. 6 is a flow chart showing an example of processing flow performed by the image processing apparatus 10 according to an exemplary embodiment of the present invention. The flow of processing is shown for a case in which a program stored on the storage device 14 is executed by the controller 22.

At step 100, acquisition of original image data is performed according to the settings, and processing then proceeds to step 102. For example, whether to acquire an original image read-in by an image reading-in device as electronic document data, or whether to acquire electronic document data stored, for example, in the storage device 14, is settable by selecting the "reading-in method" on the setting screen in FIG. 5, and the read-in image data acquiring section 24 acquires the original image data according to this setting.

At step 102, image component separation is performed and processing proceeds to step 104. In image component separation, analysis is performed on the acquired electronic document data by the layout analyzing section 26, regions of text, graphics (CG), lines, photographs, tables and the like, are extracted and image component regions determined, with the image components being extracted by the image component type determination section 28. Then, data of expression format according to the type of each image component is generated by the various data generation sections 30 (the text data generation section 30A, the CG data generation section 30B, the line data generation section 30C, the photograph data generation section 30D and the table data generation section 30E).

At step 104, determination is made as to whether or not reusability emphasis mode has been set. It is determined whether or not the operation section 18 has been operated to set the reusability emphasis mode. When negative determination is made (in the present exemplary embodiment: when the original layout emphasis mode has been set), processing proceeds to step 106, and when affirmative determination is made processing proceeds to step 108.

At step 106, a file of the designated format is generated in which the image components have been re-laid out, and processing proceeds to step 114. Namely, data in the expression format according to the type of each of the image components generated by the various data generation sections 30 (the text data generation section 30A, the CG data generation section 30B, the line data generation section 30C, the photograph data generation section 30D and the table data generation section 30E) is re-laid out in a similar manner to as in the original image, and the software data generation section 34 generates a file (software data) according to the output data format designated by the operation section 18. The image components are thus re-laid out in a reusable format, and the original image is accurately reproduced.

At step 108, determination is made as to whether or not to extract particular type(s) of image component. It is determined whether "designated image components" (one or more option from "all", "photographs", "graphics", "text", and "tables") has been selected on the setting screen shown in FIG. 5 by operation of the operation section 18, and when affirmative determination is made, processing proceeds to step 110, and when negative determination is made processing proceeds to step 112.

At step 110, the particular type(s) of image components are extracted and re-laid out, a file of the designated format is generated, and processing proceeds to step 114. Namely, the inter-page layout changing section 32 extracts the type(s) of image component designated by the operation section 18 and re-lays out the data of the expression format according to the type of image component, and the software data generation section 34 generates a file (software data) according to the output data format designated by the operation section 18. In cases where plural "designated image components" have been designated, configuration may be made such that the image components are re-laid out with a page separation by type of image component, and a file is generated according to the output data format.

Figure 7:
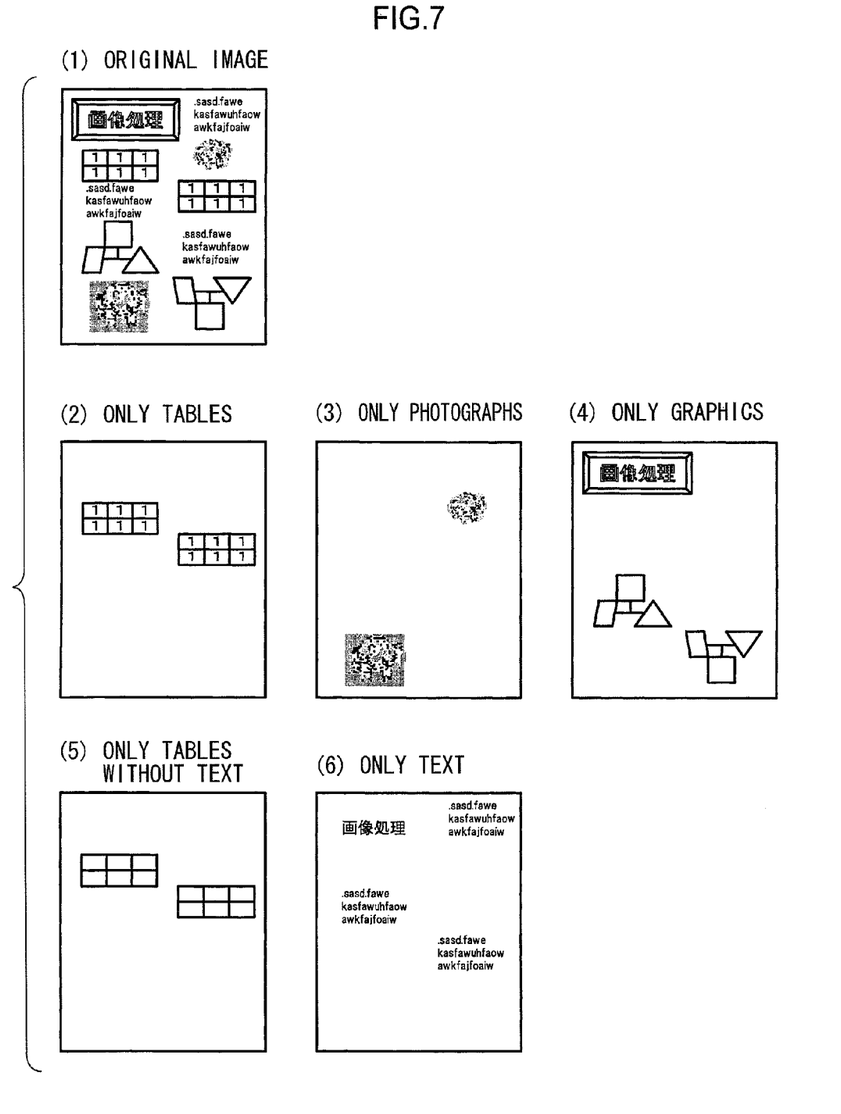
FIG. 7 is a diagram showing an example of re-laying out image components with an original image of a single page, in a case where a reusability emphasis mode has been selected, in an image processing apparatus according to an exemplary embodiment of the present invention.
Figure 8:
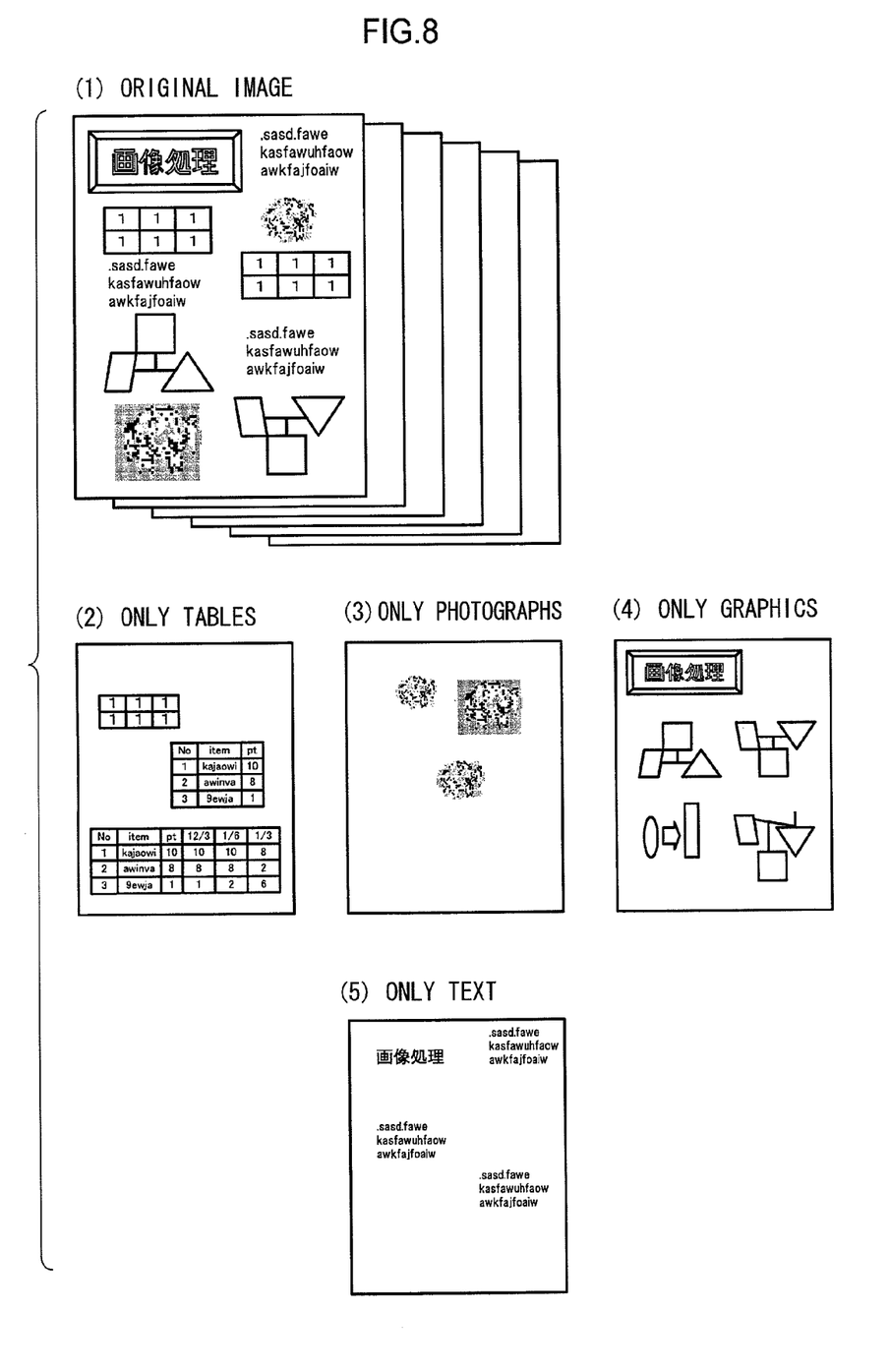
FIG. 8 is a diagram showing an example of re-laying out image components with an original image of plural pages, in a case where a reusability emphasis mode has been selected, in an image processing apparatus according to an exemplary embodiment of the present invention.

At step 112, the image components are re-laid out by their type, a file of the designated format is generated, and processing proceeds to step 114. Namely, the inter-page layout changing section 32 extracts the image components by type and re-lays out the data of the expression format according to image component type, and the software data generation section 34 generates a file (software data) according to the output data format designated by the operation section 18. For example, in a case of an original image with page 1 like that shown in FIG. 7 (1), configuration may be made such that re-laying out is by positioning different types of image component by page, so as to give a table image component page (FIG. 7 (2)), a photograph image component page (FIG. 7 (3)), a graphic image component page (FIG. 7 (4)), a table-without-text image component page (FIG. 7 (5)), a text image component page (FIG. 7 (6)), and the like, and a file is generated. Alternatively, configuration may be made such that different types of image component are re-laid out by collecting together by page, and a file is generated. In cases in which the original image is plural pages, as shown in FIG. 8 (1), configuration may be made such that re-laying out is performed such that different types of image components are collected together by each page, so as to give a page on which the table image components of each of the pages of the original image are collected together (FIG. 8 (2)), a page on which the photograph image components of each of the pages of the original image are collected together (FIG. 8 (3)), a page on which the graphic image components of each of the pages of the original image are collected together (FIG. 8 (4)), a page on which the text image components of each of the pages of the original image are collected together (FIG. 8 (5)), and the like, and a file is generated. In such cases, an attribute indicating which page the image component was on in the original image may be applied, such as, for example, as a property of the image component. In cases where the designated output data format is set as "image component compliant software", software data is generated according to the type of the image components. Namely, the image components are split up with one type of image component for each page, and software data is generated according to the type of image component on each page.

Then, at step 114, file(s) generated at one or other of steps 106, 110, and 112 are output, completing one cycle of processing. Configuration may be made such that, for example, the output destination of the file(s) is output and storage on the storage device 14, output to a predetermined output destination, or output to an output destination preset by the operation section 18.

In this manner, with the image processing apparatus 10 according to the present exemplary embodiment, finding the required image component is facilitated when reusing image components in cases in which reusability emphasis mode is selected, since the image components are re-laid out according to type of image component, improving reusability during reuse.

Note that while explanation has been given with reference to an image processing apparatus in the above exemplary embodiments, application may be made to an image forming apparatus provided with an image reading-in device for reading-in original images.

Furthermore, while explanation has been given in the above exemplary embodiments of processing performed by execution of a program, there is no limitation thereto, and configuration may be made with hardware execution.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a separation section that separates image components having different attributes contained in electronic document data expressing an original image;
   a selection section that selects which mode from a plurality of modes including a reusability emphasis mode for performing predetermined re-laying out of the image components with emphasis on reusability; and
   a generation section that re-lays the image components separated by the separation section according to the mode selected by the selection section, and generates software data corresponding to software for use.

2. The image processing apparatus of claim 1, wherein the generation section, in cases where the reusability emphasis mode has been selected by the selection section, re-lays out the image components separated by the separation section with a page separation by type of image component, and generates the software data.

3. The image processing apparatus of claim 1, wherein the generation section, in cases where the reusability emphasis mode has been selected by the selection section, extracts and collects together the image components of a pre-designated type, and generates the software data.

4. The image processing apparatus of claim 3, wherein the generation section, in cases where the reusability emphasis mode has been selected by the selection section, generates the software data corresponding to software according to the type of the image components separated by the separation section.

5. The image processing apparatus of claim 1, wherein the generation section re-lays out the image components in an expression format according to the type of the image component separated by the separation section, and generates the software data.

6. The image processing apparatus of claim 5, wherein, when the separation section separates the image components, if there are image components corresponding to a plurality of attributes, the generation section re-lays out the image components in an expression format corresponding to the respective image component, and generates software data.

7. The image processing apparatus of claim 1, wherein:
   the original image has a plurality of pages; and
   the generation section, in cases where the reusability emphasis mode has been selected by the selection section, re-lays out the image components such that different image components separated by the separation section are collected together on each page, and generates the software data.

8. The image processing apparatus of claim 7, wherein an attribute indicating which page an image component was on in the original image is applied as a property of the image component.

9. An image processing method comprising:
   separating image components having different attributes contained in electronic document data expressing an original image;
   selecting which mode from a plurality of modes including a reusability emphasis mode for performing predetermined re-laying out of the image components with emphasis on reusability; and
   re-laying the image components according to the selected mode and generating software data corresponding to software for use.

10. A non-transitory computer readable medium storing an information processing program that causes a computer to operate as the image processing apparatus according to claim 1.

* * * * *